US012632181B2

(12) United States Patent
Kachare et al.

(10) Patent No.: US 12,632,181 B2
(45) Date of Patent: **\*May 19, 2026**

(54) SYSTEMS, METHODS, AND DEVICES FOR DATA STORAGE WITH SPECIFIED DATA TRANSFER RATE

(71) Applicant: Samsung Electronics Co., Ltd., Suwon-si (KR)

(72) Inventors: Ramdas P. Kachare, Pleasanton, CA (US); Sungwook Ryu, Palo Alto, CA (US)

(73) Assignee: Samsung Electronics Co., Ltd. (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/222,422

(22) Filed: Jul. 14, 2023

(65) Prior Publication Data

US 2023/0359362 A1 Nov. 9, 2023

Related U.S. Application Data

(63) Continuation of application No. 17/308,991, filed on May 5, 2021, now Pat. No. 11,726,659.

(Continued)

(51) Int. Cl.
*G06F 3/06* (2006.01)

(52) U.S. Cl.
CPC .......... *G06F 3/0613* (2013.01); *G06F 3/0604* (2013.01); *G06F 3/0653* (2013.01); *G06F 3/0659* (2013.01); *G06F 3/067* (2013.01)

(58) Field of Classification Search
CPC .... G06F 3/0613; G06F 3/0604; G06F 3/0653; G06F 3/0659; G06F 3/067
See application file for complete search history.

(56) References Cited

U.S. PATENT DOCUMENTS 7,567,587 B1 7/2009 Mlazgar et al.
8,010,742 B2 8/2011 Molaro et al.
(Continued)

OTHER PUBLICATIONS

Fang, Kun, Hongzhong Zheng, and Zhichun Zhu. "Heterogeneous mini-rank: Adaptive, power-efficient memory architecture." 2010 39th International Conference on Parallel Processing. IEEE, 2010. (Year: 2010).\*

(Continued)

*Primary Examiner* — Nicholas J Simonetti
(74) *Attorney, Agent, or Firm* — Renaissance IP Law Group LLP

(57) ABSTRACT

A method may include receiving, at a storage device, a command for a data transfer between the storage device and a host, determining a specified data rate for the data transfer, and performing the data transfer between the storage device and the host based on the command, wherein the storage device may control the data transfer based on the specified data rate. The data transfer may include a peak portion and an idle portion. The method may further include controlling, at the storage device, a peak portion and an idle portion of the data transfer based on the specified data rate. The method may further include controlling, at the storage device, the data transfer based on a peak burst size. The specified data rate may be received from the host and/or determined by the storage device by monitoring one or more parameters of a data transfer.

20 Claims, 11 Drawing Sheets

Related U.S. Application Data

(60) Provisional application No. 63/159,445, filed on Mar. 10, 2021.

(56)                References Cited

U.S. PATENT DOCUMENTS

| | | | |
|---|---|---|---|
| 9,229,638 B1 | 1/2016 | Bora et al. | |
| 10,042,416 B2 | 8/2018 | Tzafrir et al. | |
| 10,296,233 B2 | 5/2019 | Kim et al. | |
| 10,719,459 B2 * | 7/2020 | Kowles | G06F 13/1689 |
| 10,802,762 B1 * | 10/2020 | Gray | G06F 3/0604 |
| 10,891,179 B2 | 1/2021 | Sundrani et al. | |
| 2003/0027579 A1 | 2/2003 | Sydon | |
| 2005/0210216 A1 | 9/2005 | Jobs et al. | |
| 2008/0310307 A1 | 12/2008 | Yeom | |
| 2011/0179248 A1 | 7/2011 | Lee | |
| 2014/0195745 A1 * | 7/2014 | Shiratori | G06F 3/0682 |
| | | | 711/154 |
| 2014/0215129 A1 * | 7/2014 | Kuzmin | G06F 12/0246 |
| | | | 711/103 |
| 2015/0023240 A1 * | 1/2015 | Gholmieh | H04W 52/44 |
| | | | 370/311 |
| 2015/0301763 A1 * | 10/2015 | Shaharabany | G06F 12/0246 |
| | | | 711/147 |
| 2016/0070662 A1 * | 3/2016 | Ly | G06F 11/1076 |
| | | | 711/169 |
| 2016/0110132 A1 | 4/2016 | Wei et al. | |
| 2017/0068451 A1 * | 3/2017 | Kenan | G06F 3/0659 |
| 2017/0229159 A1 * | 8/2017 | Huen | G06F 3/0613 |
| 2018/0217929 A1 * | 8/2018 | Lillibridge | G06F 3/0644 |
| 2019/0004733 A1 | 1/2019 | Ebsen et al. | |
| 2019/0065116 A1 * | 2/2019 | Sekine | G06F 3/0604 |
| 2020/0401319 A1 * | 12/2020 | Breuer | G06F 3/0682 |
| 2021/0064237 A1 * | 3/2021 | Kale | G06F 3/061 |

OTHER PUBLICATIONS

Kissel, Ezra, and Martin Swany. "Session layer burst switching for high performance data movement." Proceedings of PFLDNet. 2010. (Year: 2010).*

Grupp, Laura M., John D. Davis, and Steven Swanson. "The Harey Tortoise: Managing Heterogeneous Write Performance in {SSDs}." 2013 USENIX Annual Technical Conference (USENIX ATC 13). 2013. (Year: 2013).*

Xie, Mingli, et al. "Improving system throughput and fairness simultaneously in shared memory CMP systems via dynamic bank partitioning." 2014 IEEE 20th International Symposium on High Performance Computer Architecture (HPCA). IEEE, 2014. (Year: 2014).*

Hu, Yang, et al. "Performance impact and interplay of SSD parallelism through advanced commands, allocation strategy and data granularity." Proceedings of the international conference on Supercomputing. 2011. (Year: 2011).*

Advisory Action for U.S. Appl. No. 17/308,991, mailed Feb. 7, 2023.

Final Office Action for U.S. Appl. No. 17/308,991, mailed Nov. 2, 2022.

Notice of Allowance for U.S. Appl. No. 17/308,991, mailed Mar. 20, 2023.

Office Action for U.S. Appl. No. 17/308,991, mailed Apr. 1, 2022.

* cited by examiner

300

SYSTEMS, METHODS, AND DEVICES FOR DATA STORAGE WITH SPECIFIED DATA TRANSFER RATE

REFERENCE TO RELATED APPLICATIONS

This application is a continuation of U.S. patent application Ser. No. 17/308,991, filed May 5, 2021, which claims priority to, and the benefit of, U.S. Provisional Patent Application Ser. No. 63/159,445 filed Mar. 10, 2021, both of which are incorporated by reference.

TECHNICAL FIELD

This disclosure relates generally to data storage, and more specifically to systems, methods, and devices for data storage with specified data transfer rate.

BACKGROUND

Data may be transferred between a host and a storage device at a data rate determined by a host bus peak rate.

The above information disclosed in this Background section is only for enhancement of understanding of the background of the invention and therefore it may contain information that does not constitute prior art.

SUMMARY

A method may include receiving, at a storage device, a command for a data transfer between the storage device and a host, determining a specified data rate for the data transfer, and performing the data transfer between the storage device and the host based on the command, wherein the storage device may control the data transfer based on the specified data rate. The command may be a first command, the data transfer may be a first data transfer, the host may be a first host, and the specified data rate may be a first specified data rate, the method further may include receiving, at the storage device, a second command for a second data transfer between the storage device and a second host, determining a second specified data rate for the second data transfer, and performing the second data transfer between the storage device and the second host based on the second command, wherein the storage device may control the second data transfer based on the second specified data rate. The first data transfer may overlap the second data transfer. The data transfer may include a peak portion and an idle portion. The method may further include controlling, at the storage device, the peak portion and the idle portion based on the specified data rate. The method may further include determining, at the storage device, a peak burst size, and controlling, at the storage device, the data transfer based on the peak burst size. The data transfer may include a peak portion, the method may further include controlling, at the storage device, the peak portion based on the peak burst size. Determining the specified data rate may include receiving the specified data rate from the host. Determining the specified data rate may include determining the specified data rate at the storage device. Determining the specified data rate at the storage device may include monitoring, at the storage device, a parameter of one or more data transfers between the storage device and one or more hosts, and determining, at the storage device, the specified data rate based on the monitoring. Determining the peak burst size may include receiving the peak burst size from the host. Determining the specified data rate may include determining the peak burst size at the storage device. Determining the peak burst size at the storage device may include monitoring, at the storage device, a parameter of one or more data transfers between the storage device and one or more hosts, and determining, at the storage device, the peak burst size based on the monitoring. The specified data rate may include a constant bit rate. The data transfer may overlap a background operation of the storage device.

A storage device may include storage medium, and a storage device controller configured to receive a command for a data transfer between the storage medium and a host, determine a specified data rate for the data transfer, perform the data transfer between the storage medium and the host based on the command, and control the data transfer based on the specified data rate. The command may be a first command, the data transfer may be a first data transfer, the host may be a first host, and the specified data rate may be a first specified data rate, and the storage device controller may be further configured to receive a second command for a second data transfer between the storage medium and a second host, determine a second specified data rate for the second data transfer, perform the second data transfer between the storage medium and the second host based on the second command, and control the second data transfer based on the second specified data rate. The first data transfer may overlap the second data transfer.

A system may include a host, and a storage device connected to the host, the storage device may include a storage device controller configured to receive a command for a data transfer between the storage device and the host, determine a specified data rate for the data transfer, perform the data transfer between the storage medium and the host based on the command, and control the data transfer based on the specified data rate. The host may be configured to query the storage device to determine a specified data rate capability of the storage device, and send the specified data rate to the storage device based on the query.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

3

Figure 4:
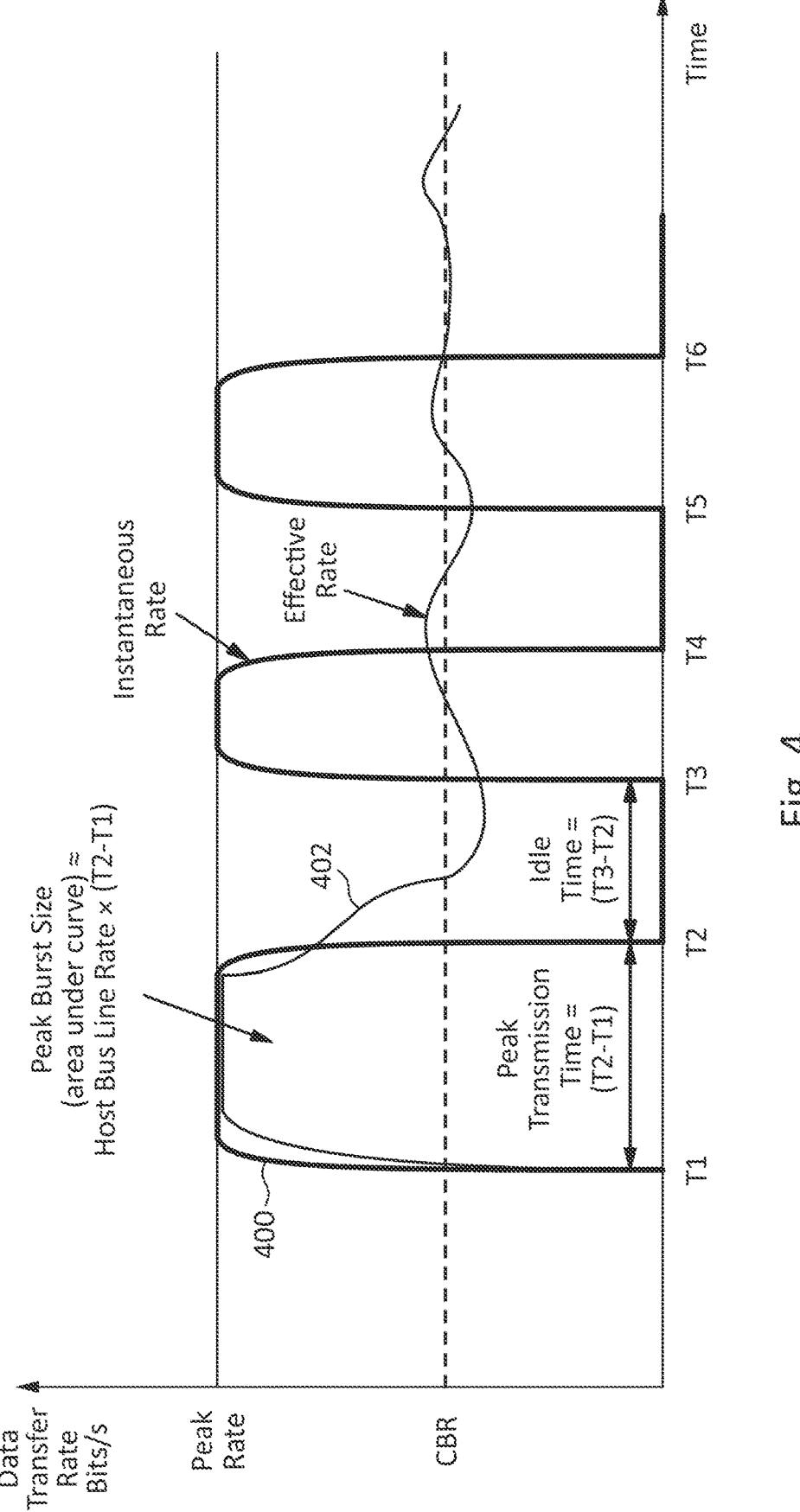

FIG. 4 illustrates an embodiment of a data transfer at a constant bit rate and maximum peak burst size in accordance with example embodiments of the disclosure.

Figure 5A:
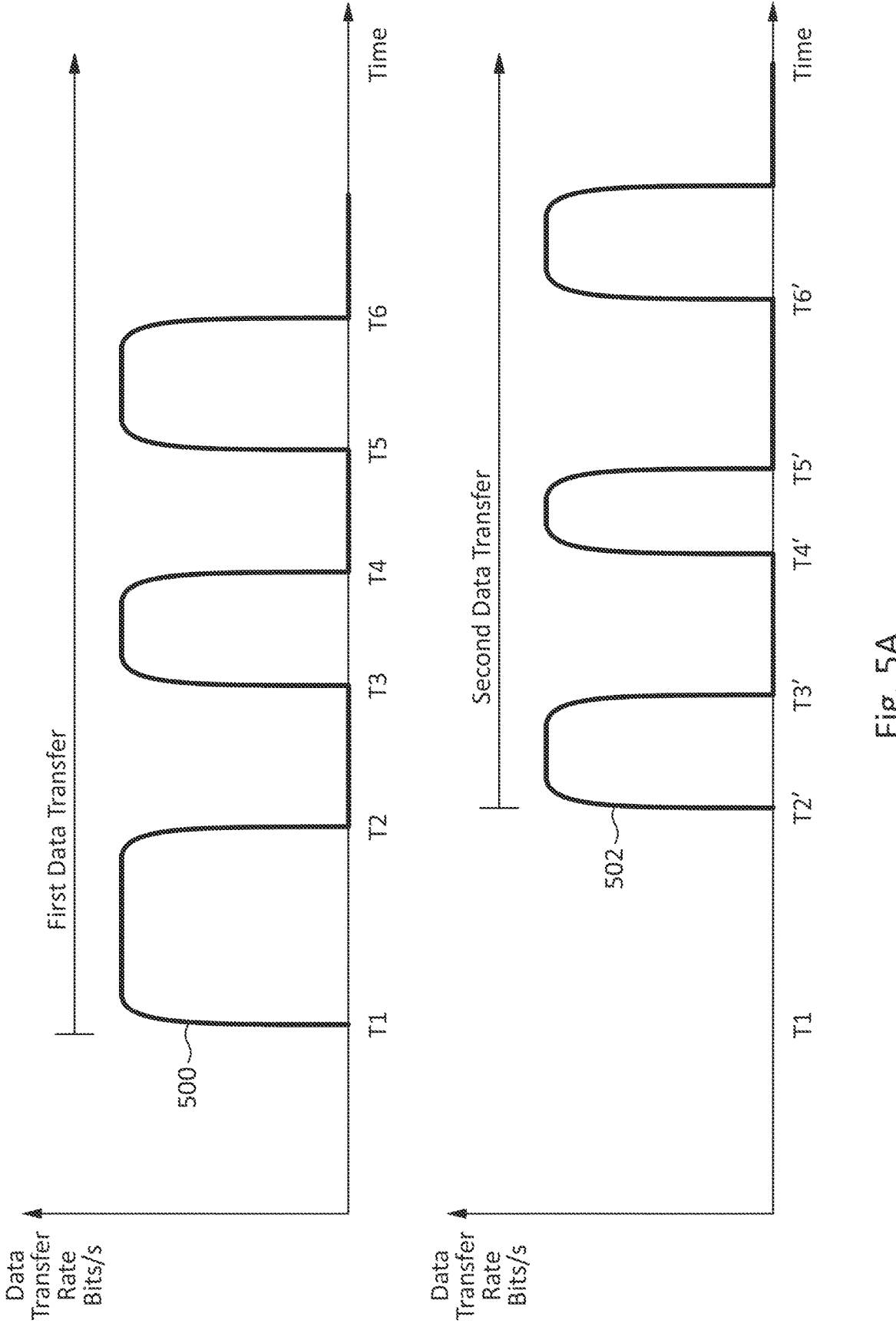

FIG. 5A illustrates an embodiment of two concurrent data transfers by a storage device, wherein each data transfer may have a constant bit rate and/or maximum peak burst size in accordance with example embodiments of the disclosure.

Figure 5B:
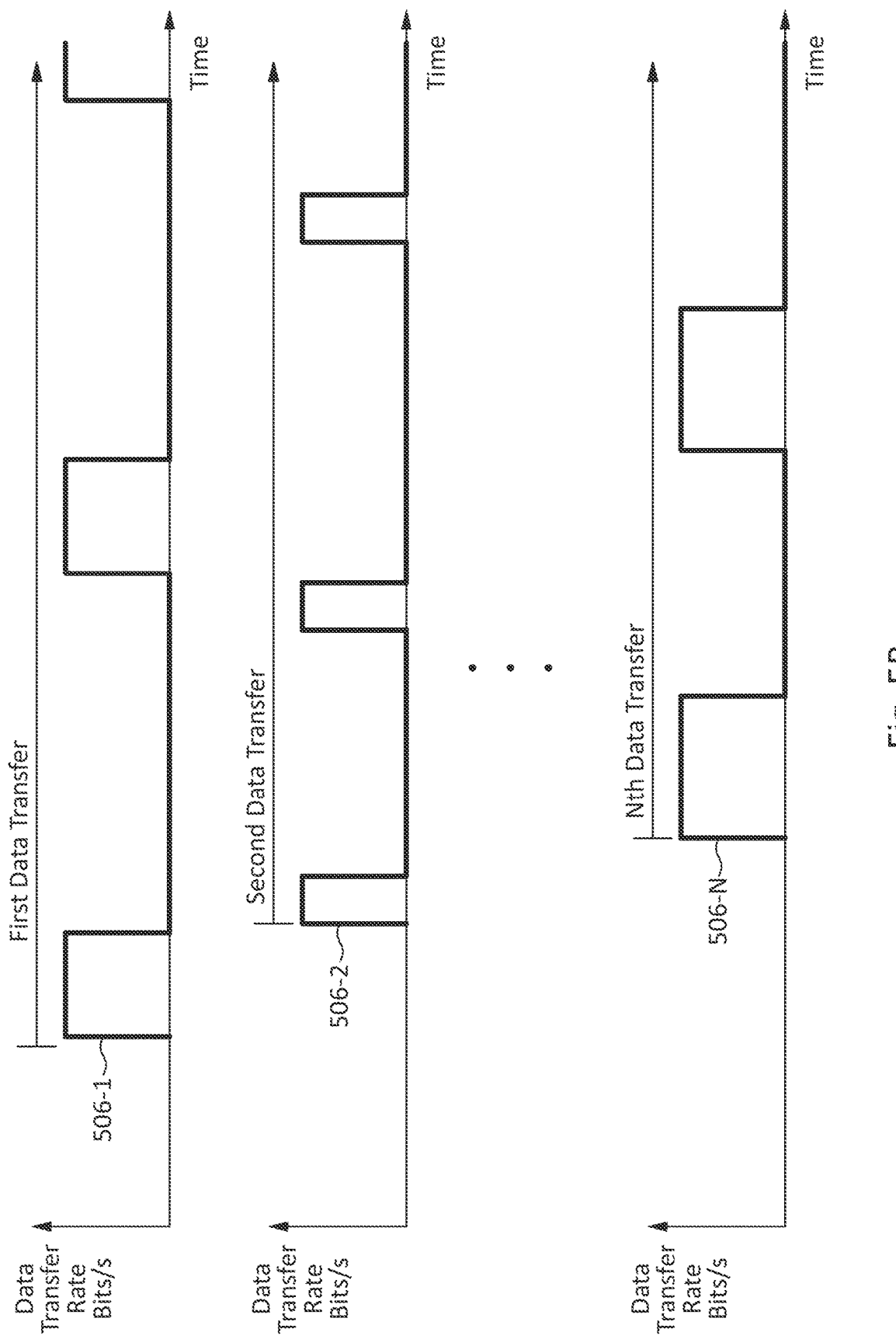

FIG. 5B illustrates an embodiment of N concurrent data transfers by a storage device, wherein each data transfer may have a constant bit rate and/or maximum peak burst size in accordance with example embodiments of the disclosure.

Figure 6:
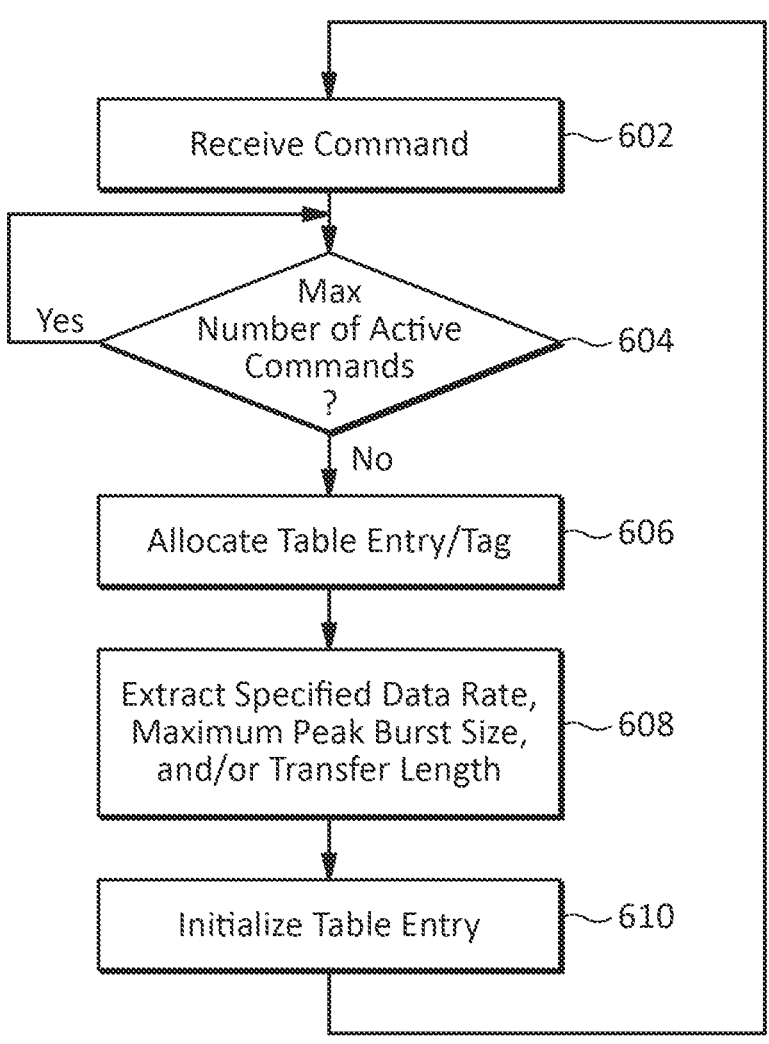

FIG. 6 illustrates an embodiment of a method for receiving commands having a specified data rate and/or peak burst size at a storage device in accordance with example embodiments of the disclosure.

Figure 7:
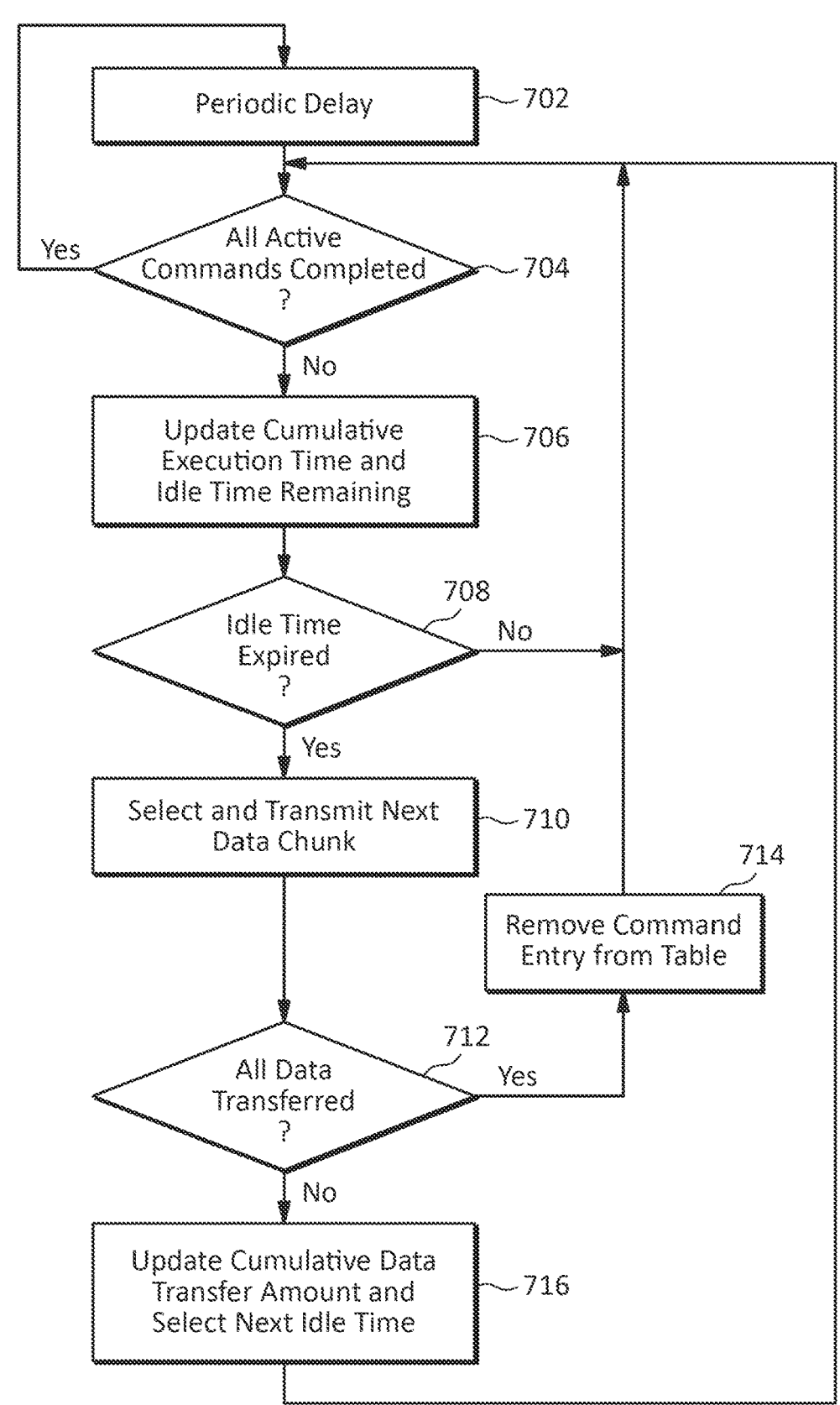

FIG. 7 illustrates an embodiment of a method for executing commands having a specified data rate and/or peak burst size at a storage device in accordance with example embodiments of the disclosure.

Figure 8:
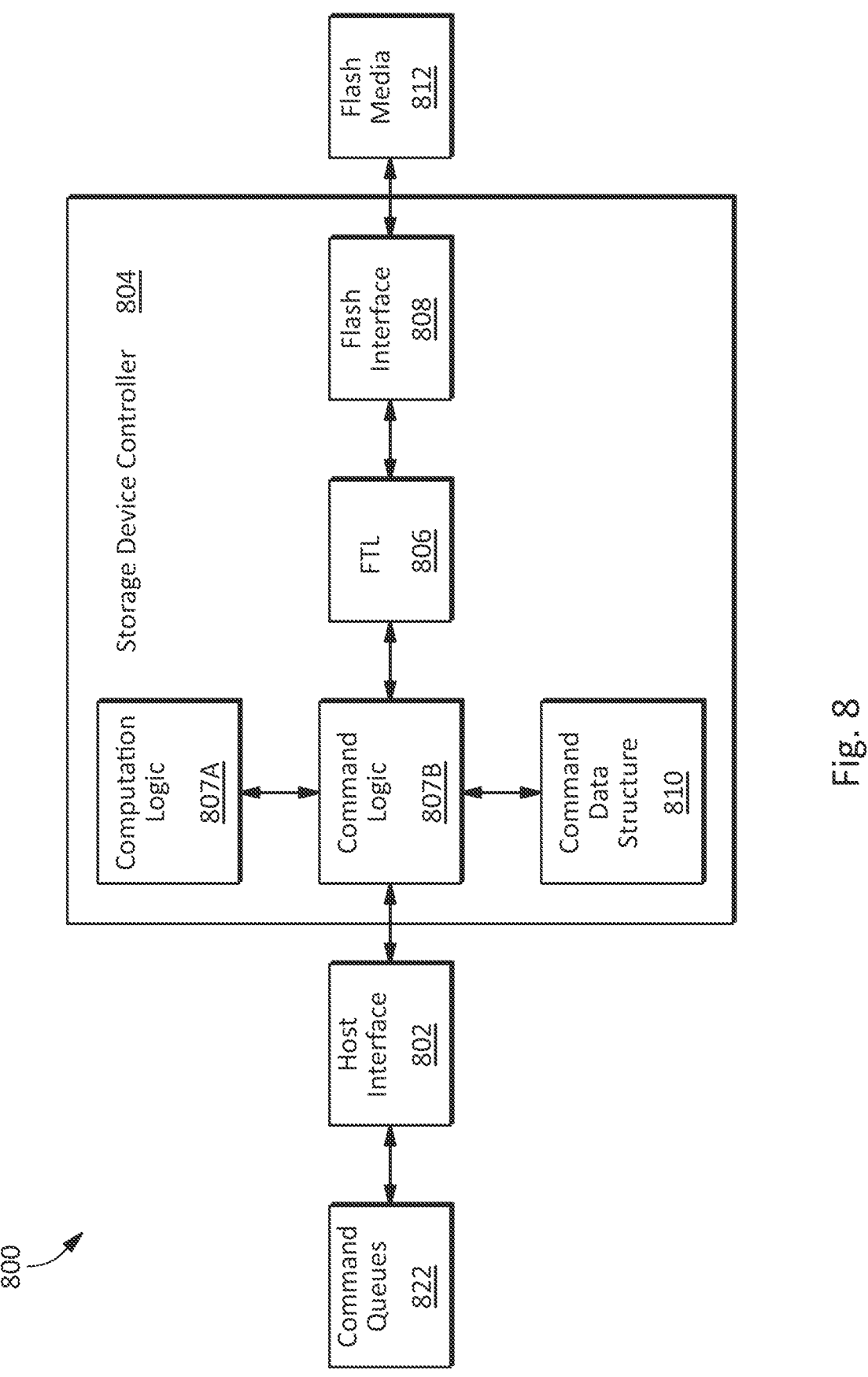

FIG. 8 illustrates an example embodiment of a storage device that may implement data transfers with a specified data rate and/or peak burst size in accordance with example embodiments of the disclosure.

Figure 9:
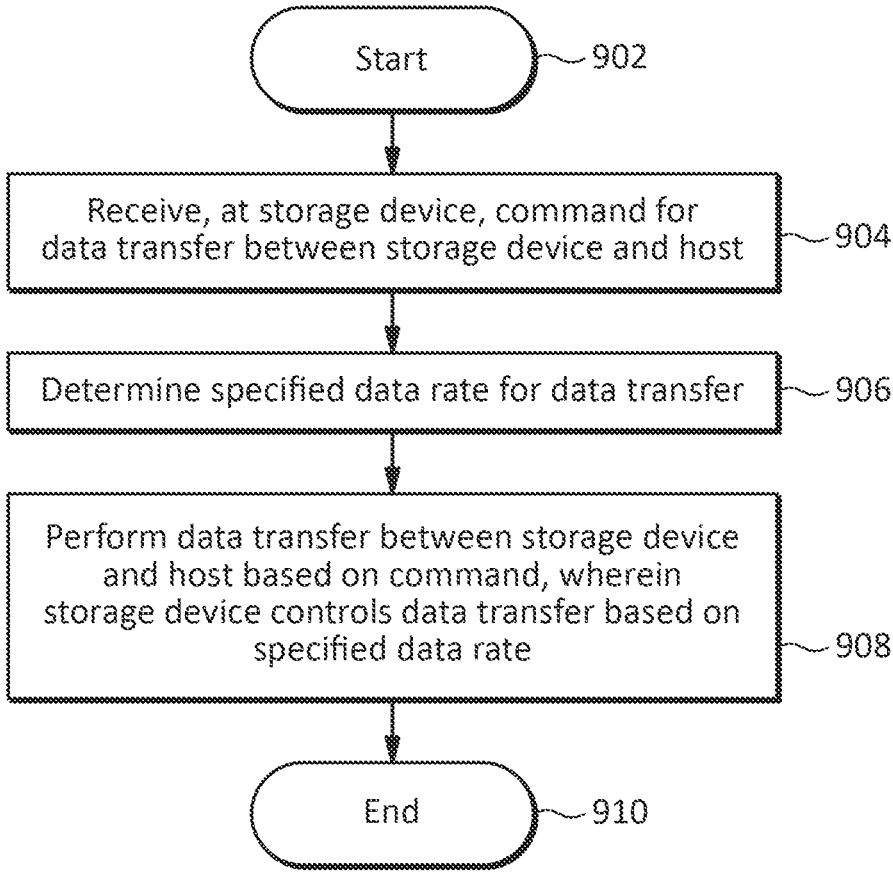

FIG. 9 illustrates an embodiment of a method in accordance with example embodiments of the disclosure.

Figure 10:
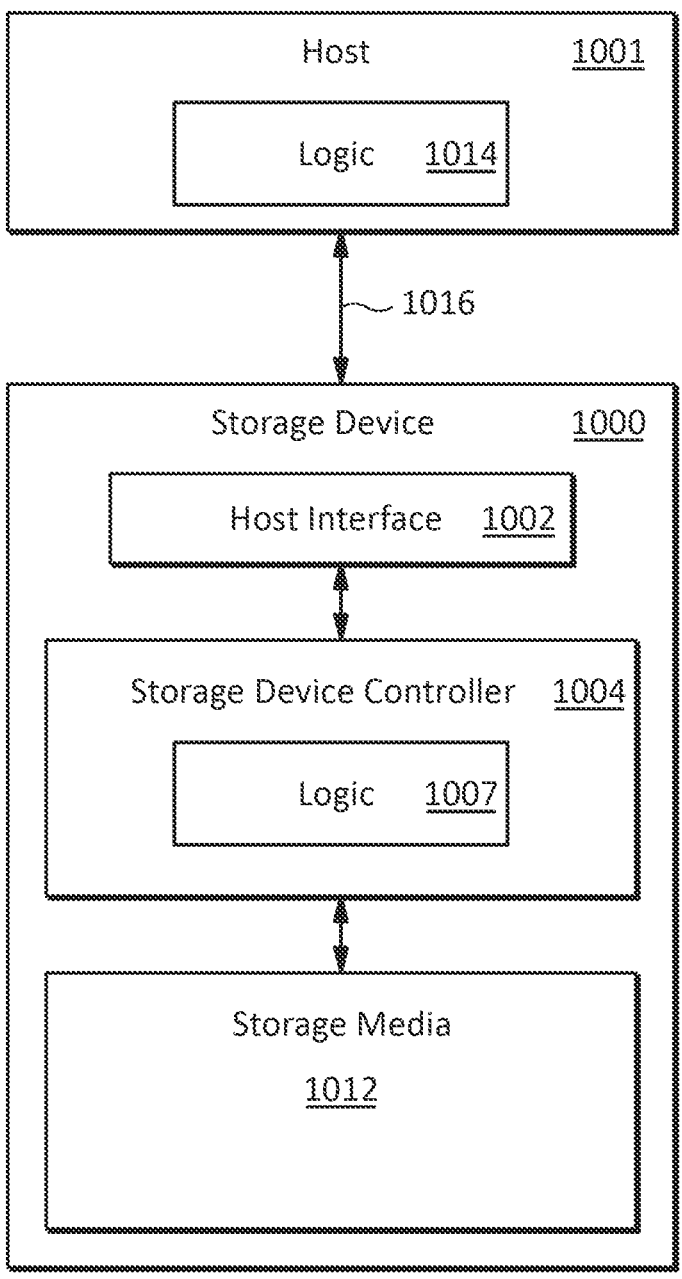

FIG. 10 illustrates an example embodiment of a system having a host and a storage device capable of performing data transfers with a specified data rate and/or peak burst size in accordance with example embodiments of the disclosure.

DETAILED DESCRIPTION

Overview

A storage device in accordance with example embodiments of the disclosure may control the transfer of data to and/or from a host at a specified data rate. For example, in response to a read command, a storage device may transmit data to a host at a constant bit rate (CBR), which may specify an average data transfer rate in terms of bits per second. As another example, in response to a write command, a storage device may fetch data from a host at a constant bit rate.

Additionally, or alternatively, a storage device may control the transfer of data to and/or from a host at a peak burst size which may specify, for example, an amount of data that may be transferred at a peak rate during a peak interval.

Depending on the implementation details, controlling data transfers at a specified data rate and/or a peak burst size may enable a storage device to implement a data stream that may be customized to the characteristics of the host, thereby improving or optimizing the usage of system, network, and/or device resources. For example, an application running on a host may have a required data rate that may be lower than the line rate of a host bus. By using the required data rate as the specified data rate, some of the host bus bandwidth may be used by one or more other applications and/or hosts.

Moreover, controlling data transfers at a specified data rate and/or a peak burst size may enable a storage device to support multiple concurrent data streams to and/or from one or more hosts in a manner that may customize each data stream to the characteristics of the corresponding host. This, in turn, may enable improved, optimized, and/or efficient co-existence of different applications and/or hosts (e.g., virtual machines (VMs), containers, and/or the like) that may use the same storage device. Moreover, it may enable improved, optimized, and/or efficient multitenancy across multiple clients of a storage device. In some embodiments, the use of a specified data rate and/or a peak burst size may be helpful for applications such as streaming (e.g., video, audio, and/or the like), and/or may help reduce network congestion and/or may help improve overall Quality of Service (QoS) enforcements. In some embodiments, the use of a specified data rate and/or a peak burst size may also enable finer granular control of data transfer bandwidth allocations for different applications.

The specified data rate and/or peak burst size for a data transfer may be determined by a host, by a storage device, by a combination thereof, or in any other suitable manner. For example, in some embodiments, a host may choose values for a specified data rate and/or peak burst size for a data transfer, and send these values to the storage device along with a read or write command. In some other embodiments, the storage device may determine a specified data rate and/or peak burst size for a data transfer, for example, by applying artificial intelligence (AI), machine learning, and/or the like to information obtained by monitoring previous data transfers, system characteristics, device characteristics, network characteristics, and/or the like.

In some embodiments, a specified data rate may be implemented by alternating periods of peak transfer rate (e.g., transferring data at a peak line rate) and idle (e.g., transferring no data). For example, a storage device may select a peak transmission time and an idle time to provide a constant bit rate. In some embodiments, the storage device may implement concurrent data streams, for example, by transferring data for one data stream during an idle period of another data stream.

The principles disclosed herein have independent utility and may be embodied individually, and not every embodiment may utilize every principle. However, the principles may also be embodied in various combinations, some of which may amplify the benefits of the individual principles in a synergistic manner.

Storage Traffic Patterns

Applications running on information technology (IT) infrastructure in accordance with example embodiments of the disclosure may generate and/or process data to provide services to end users of the applications. In some embodiments, applications may require fast and/or reliable access to data storage resources with low latency, high reliability, high availability, deterministic and/or predictable latencies and/or bandwidths for accessing data. However, as described in more detail below, complexities involved in some embodiments of data storage systems may make it difficult to provide deterministic and/or predictable data access behavior to the applications. This, in turn, may create additional complexities, inefficiencies, and/or the like, in an IT system.

An additional source of non-deterministic and/or unpredictable data access behavior may be background functions implemented by storage devices to manage their storage media. For example, as explained in more detail below, a solid state drive (SSD) may have a controller that may implement one or more complex functions to manage persistent media such as not-AND (NAND) flash storage media. In some embodiments, the complex nature of background management tasks (as well as media characteristics, measures to maximize host bus bandwidth, and/or the like) may cause data transfers performed by an SSD to exhibit bursty and/or unpredictable behavior.

In some embodiments, an application may implement a data buffer to accommodate bursty data transfer behavior from a storage device. However, this may consume valuable resources and/or increase the complexity and/or cost of the application. Moreover, the non-deterministic and/or unpredictable nature of bursty data traffic patterns may increase the difficulty of correctly sizing data buffers for end user applications and/or intermediate system components such as switches, routers, and/or the like. Depending on the implementation details, this may lead to inefficient and/or suboptimal usage of system and/or device architecture and/or resources.

Moreover, some storage devices in accordance with example embodiments of the disclosure may be shared by one or more different applications and/or hosts such as virtual machines (VMs), containers, and/or the like. However, different applications and/or hosts may have different input and/or output (I/O) bandwidth characteristics (e.g., bandwidth requirements) for accessing a storage device. For example, depending on their characteristics, different applications may implement different data buffer sizes to accommodate bursty data transfer behavior from storage devices. Thus, in some embodiments, accommodating multiple applications and/or host on a shared storage device may add further complexity, non-determinism, unpredictability, and/or the like, to applications and/or storage systems.

IT Infrastructure

220 illustrates an embodiment of an IT infrastructure including data storage in accordance with example embodiments of the disclosure. The embodiment illustrated in FIG. 1 may include one or more application servers 102, one or more load balancers 104, one or more storage servers 106, and one or more storage devices 108.

An application server 102 may run one or more end user applications of various types, while a storage server 106 may manage and/or provide data storage services to the one or more of application servers 102. The load balancer 104 may distribute data traffic between storage servers 106, for example, to send a storage command from an application server 102 to an available storage server 106.

The one or more storage devices 108 may be implemented with any type of storage device that may use any type of storage media, for example, tape drives or hard disk drives (HDDs) which may include magnetic storage media, solid state drives (SSDs) which may include solid state storage media such as not-AND (NAND) flash memory, optical storage devices, storage devices based on any type of persistent memory such as cross-gridded nonvolatile memory, memory with bulk resistance change, and/or the like, and/or any combination thereof. In some embodiments, the one or more storage devices 108 may be used in one or more of the storage servers 106 and may be configured, for example, in one or more server chassis, server racks, groups of server racks, server clusters, datarooms, datacenters, edge data centers, mobile edge datacenters, and/or the like, and/or any combination thereof.

In some embodiments, the one or more application servers 106 may operate as a front-end interface to users running various applications. Thus, the one or more application servers 106 may access relevant data from the one or more of the storage servers 106 for use by one or more end user applications. The one or more storage servers 106 may manage various aspects of data storage such as managing access performance, reliability, back-ups, and/or the like.

The one or more storage servers 106 may maintain an array of one or more storage devices 108 to perform the actual data storage.

An application server 102 may send a request for a certain block of user data to a storage server 106. In response to this request, the storage server 106 may determine the location of the requested user data, read the user data from one or more of the storage devices 108 on which the data may be stored, and send the user data back to the application server 102 that requested the data.

For redundancy purposes, some embodiments may maintain multiple copies of the user data. For example, two or three copies of the same data may be maintained on separate storage devices 108 to protect against data loss due to various types of failures. If a read operation fails on one of the storage devices 108, a storage server 106 may attempt to retrieve one of the second or third copies of the user data (e.g., from another storage device). The storage server 106 may then initiate a data recovery mechanism to return the user data to the desired level of data redundancy, for example, by writing an additional copy of the user data to an additional storage device 108.

As mentioned above, the complexities involved in some embodiments of data storage systems may make it difficult to provide deterministic and/or predictable data storage access behavior to applications using the data storage resources.

Storage Devices

For purposes of illustrating the principles of the disclosure, some embodiments may be described in the context of storage devices implemented as SSDs. However, the principles may be applied to systems and/or methods using any type of storage devices based on any type of storage media including magnetic media, solid state media, optical media, and/or the like.

Figure 2:
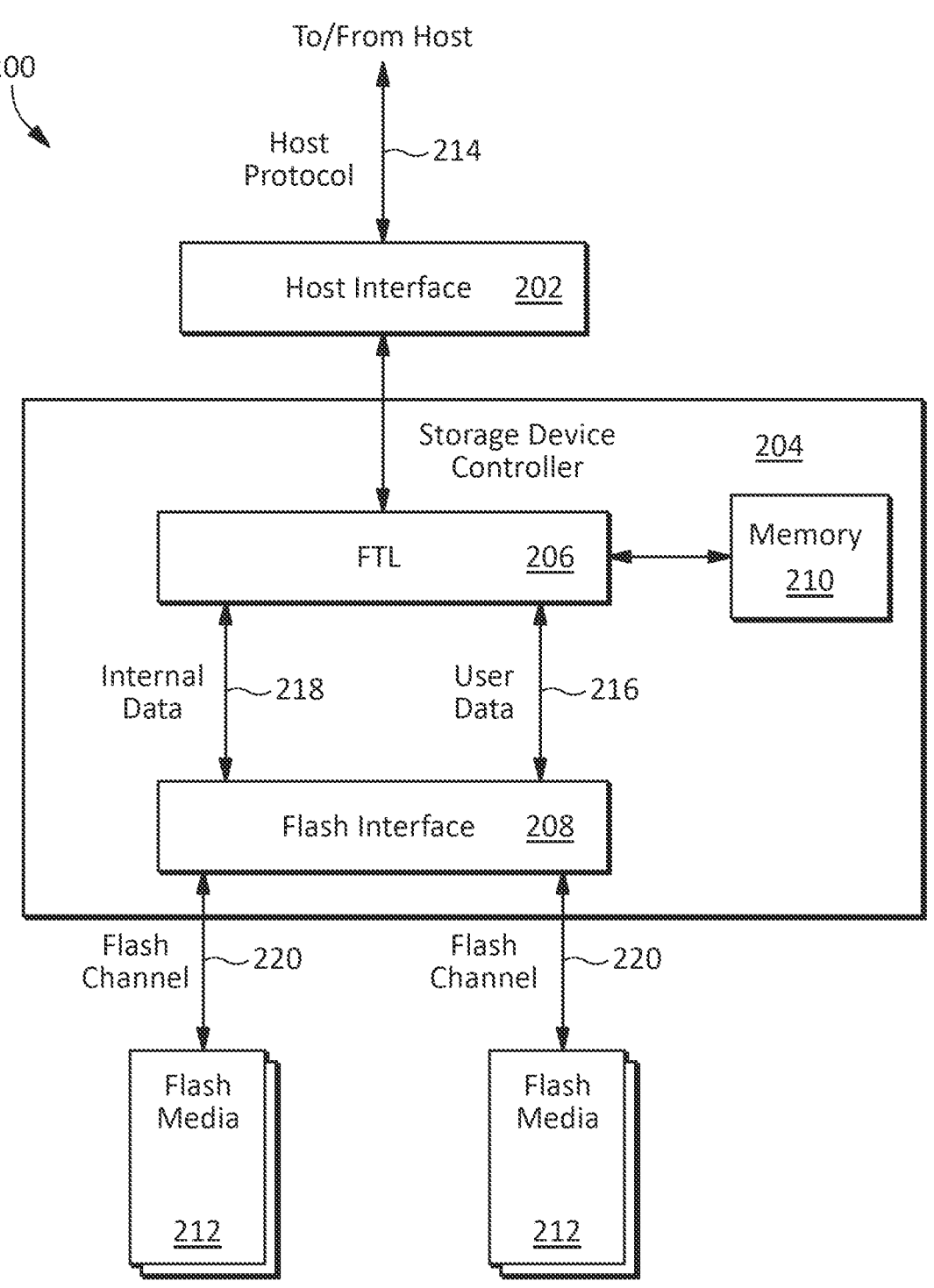
FIG. 2 illustrates an embodiment of an SSD in accordance with example embodiments of the disclosure.

FIG. 2 illustrates an embodiment of an SSD in accordance with example embodiments of the disclosure. The SSD 200 illustrated in FIG. 2 may include a host interface 202, a storage device controller 204, and one or more solid state storage media 212 which, in this embodiment, may be implemented with one or more NAND flash memory dies. The storage device controller 204 may include a flash translation layer (FTL) 206, a flash interface 208, and a memory 210. In some embodiments, the storage device controller 204 may manage the flash media 212 and/or provide data transfer access to a host to which that SSD may be attached.

The flash media 212 may be used to store user data 216 and/or internal data 218, for example, for background operations. However, different embodiments may use different types of NAND flash media, such as single-level cell (SLC), multi-level cell (MLC), triple-level cell (TLC), and/or the like, as well as different manufacturing processes. This may lead to a wide range of flash media performance characteristics which, in turn, may reduce the determinism and/or predictability of the data transfer behavior of the storage device.

Figure 1:
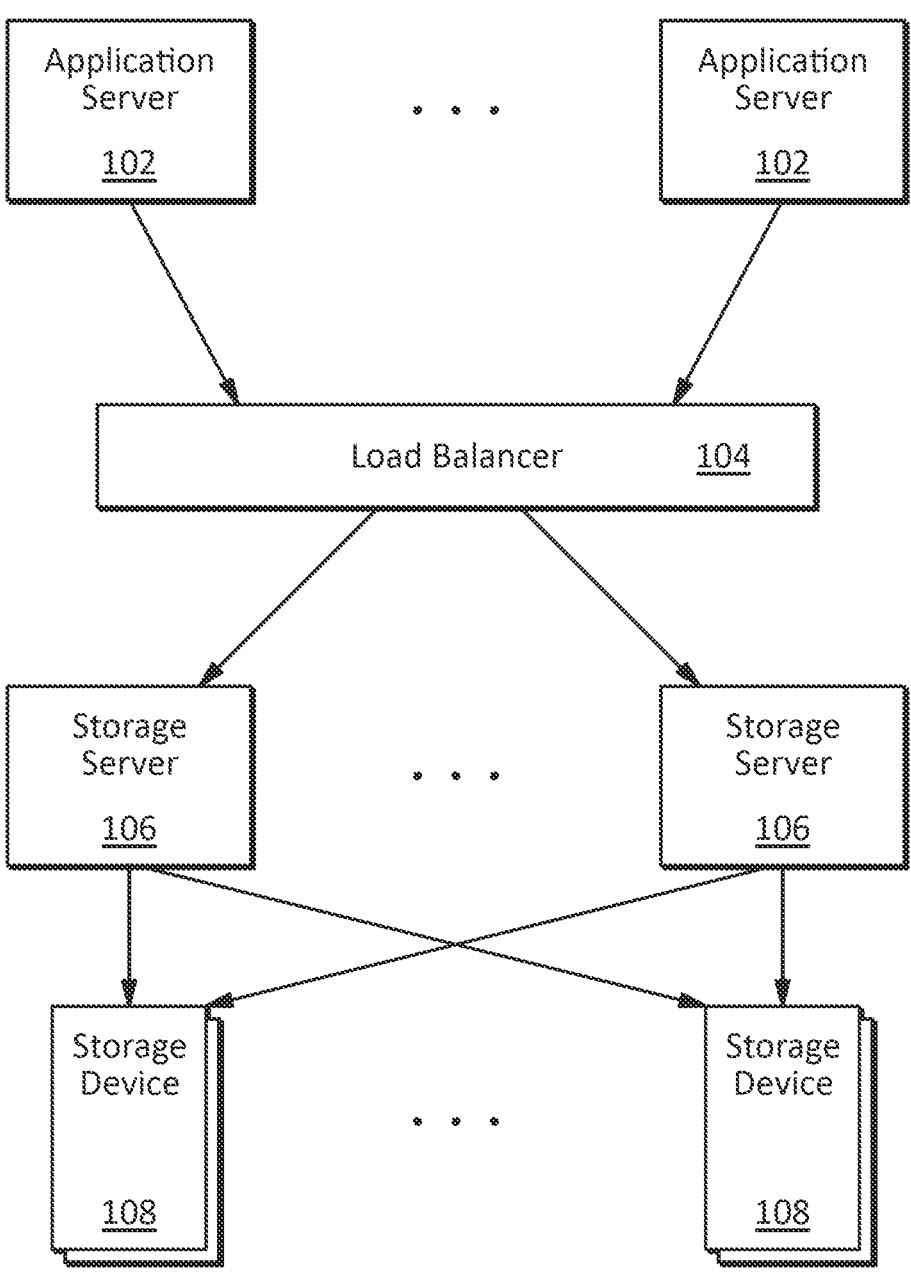
FIG. 1 illustrates an embodiment of an IT infrastructure including data storage in accordance with example embodiments of the disclosure.

The host interface 202 may enable the SSD 200 to communicate with a storage server such as one of the storage servers 106 in FIG. 1. In some embodiments, a storage server may appear as a host to the SSD 200. In some embodiments, a storage server may be essentially transparent to the SSD 200, and an application server such as one of the application servers 102 in FIG. 1 may function as a host to the SSD 200.

The host interface 202 to be implemented with any suitable interface and/or protocol 214 including Peripheral Component Interconnect Express (PCIe), Nonvolatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, Infini-Band, Serial ATA (SATA), Small Computer Systems Interface (SCSI), Serial Attached SCSI (SAS), iWARP, and/or the like.

In some embodiments, the host interface 202 may transfer read and/or write commands (e.g., data I/O commands) and/or various media management commands (e.g., Identify, Get Log, and/or the like) between the SSD 200 and a host. The host interface 202 may also be used to perform data transfers to and/or from between the SSD 200 and a host (e.g., host system memory of a storage server 106 illustrated in FIG. 1).

In some embodiments, the FTL 206 may provide a mapping between logical addresses used by a host and physical address locations of the data in the flash media 212. In some embodiments, the FTL 206 may also perform one or more background management operations as mentioned above such as garbage collection (GC), wear leveling, recovery from unsafe shutdowns, and/or the like. Thus, I/O commands from a host may co-exist with background operations, and these two types of flash media accesses may compete with each other for flash media resources. This may lead to variations in the performance characteristics observed by a host, which may reduce the determinism and/or predictability of data transfer behavior between the SSD 200 and the host. In some embodiments, the FTL 206 may store one or more internal data structures internally to the FTL 206 or in the external memory 210. This may introduce further performance variations which may also reduce the determinism and/or predictability of data transfer behavior between the SSD 200 and the host.

In some embodiments, the flash interface 208 may perform actual data read and/or write operations on the flash media 212. The flash interface 208 may implement one or more flash channels 220 to the flash media 212 using any protocol such as Open NAND Flash Interface (ONFI), Toggle, and/or the like, to access the flash media 212. Additionally, the flash media 212 may have certain media specific rules and/or timing parameters for implementing read and/or write operations. The flash Interface 208 may also operate to increase or maximize aspects of the flash media 212 such as performance, power consumption, and/or the like. The flash Interface 208 may also perform one or more operations to protect against media errors, for example, by performing data encoding and/or error correction for data reliability.

As described above, an SSD may manage one or more complex operations to provide reliable data storage. Any or all of these implementation details of the SSD 200 may lead to variations in I/O command processing performance, which may reduce the determinism and/or predictability of data transfers and/or result in bursty data transfer behavior.

Data Transfers with Specified Data Rate

Figure 3:
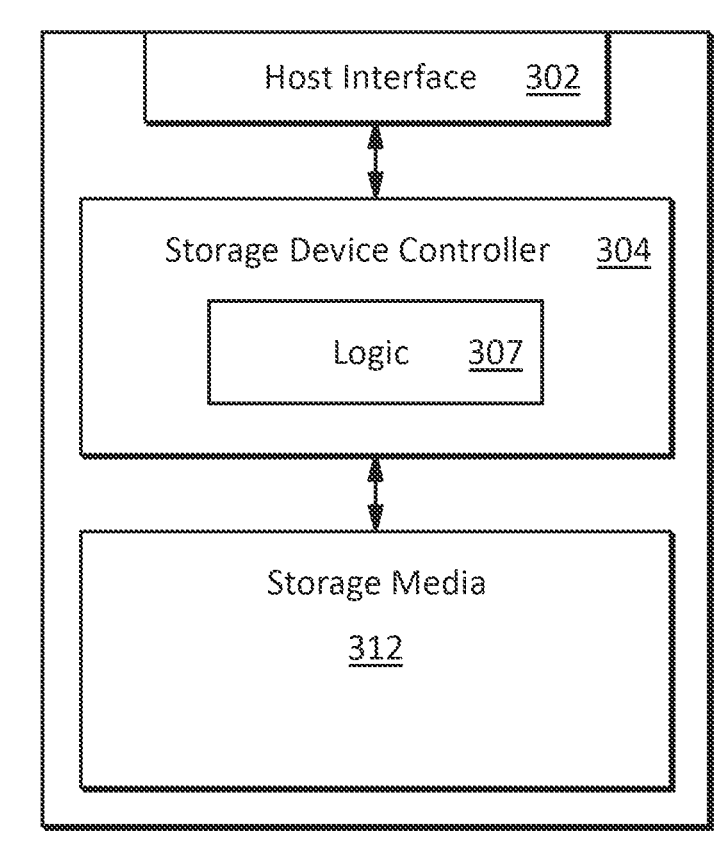
FIG. 3 illustrates an embodiment of a storage device that may implement data transfers with a specified data rate and/or peak burst size in accordance with example embodiments of the disclosure.

FIG. 3 illustrates an embodiment of a storage device that may implement data transfers with a specified data rate and/or peak burst size in accordance with example embodiments of the disclosure. The storage device 300 illustrated in FIG. 3 may include a host interface 302, a storage device controller 304, and storage media 312. In some embodiments, the storage device controller 304 may include logic 307 configured to implement data transfers with a specified data rate and/or a peak burst size.

In some embodiments, the storage device 300 may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. The host interface 302 may be implemented with any host interface and/or protocol such as any of those described above with respect to the embodiments illustrated in FIG. 1 and FIG. 2. The storage media 312 may be implemented with any media such as any of those described above with respect to the embodiments illustrated in FIG. 1 and FIG. 2. Some embodiments of the storage device 300 may be implemented entirely or partially with, and/or used in connection with, a server chassis, server rack, dataroom, datacenter, edge datacenter, mobile edge datacenter, and/or any combinations thereof, and/or the like.

In some embodiments, the logic 307 may be configured to implement any method, technique, process, operation, and/or the like disclosed herein. For example, in some embodiments, the logic 307 may be configured to receive a command for a data transfer between the storage media 312 and a host, determine a specified data rate for the data transfer, perform the data transfer between the storage media 312 and the host based on the command, and control the data transfer based on the specified data rate. In some embodiments, the logic 307 may be further configured to determine a peak burst size, and control the data transfer based on the peak burst size.

In some embodiments, the storage device controller 304 and/or the logic 307 may be implemented with hardware, software, or any combination thereof including combinational logic, sequential logic, one or more timers, counters, registers, state machines, volatile memories such as dynamic random access memory (DRAM) and/or static random access memory (SRAM), nonvolatile memory such as flash memory including not-AND (NAND) memory, persistent memory such as cross-gridded nonvolatile memory, memory with bulk resistance change, and/or the like, and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, and/or the like, executing instructions stored in any type of memory.

For purposes of illustrating the principles of the disclosure, some example implementation details may be described in the context of systems, methods and/or devices that may use SSDs and/or NVMe commands, queues, namespaces, and/or the like. However, the principles are not limited to these implementation details and may be applied to systems, methods, and/or devices using any type of storage devices, storage interface and/or protocol, and/or the like, Additionally, although specified data rate and/or peak burst size features may be described in the context of I/O commands such as NVMe Read and/or Write commands, these features may be used with any other types of commands, requests, and/or the like such as administrative commands, maintenance commands, other I/O commands, and/or the like.

In some embodiments, a specified data rate may refer to any data transfer profile that may be controlled by a storage device. In some embodiments, a specified data rate may refer to any data transfer profile in which data may be transferred at less than a peak rate of the host bus for at least a portion of the data transfer. For example, in some embodiments, a specified data rate may be implemented as a constant bit rate (CBR) which may specify an average host bus bandwidth.

In some embodiments, a CBR may be implemented, for example, by alternating between periods of peak transfer rate (e.g., transferring data at a peak line rate) on a host data bus, and an idle state (e.g., transferring no data) on the host data bus.

In some embodiments, a data transfer may refer to an operation in which a storage device may transmit a predetermined amount of data to, or receive a predetermined amount of data from, an application running on a host, such as one of the application servers 102 illustrated in FIG. 1. A data transfer may be implemented, for example, as an NVMe I/O in response to an NVMe read or write command. In such an embodiment, a specified data rate may be referred to, for example, as a specified data rate per I/O, or a specified data rate per command. In such an embodiment, if the specified data rate is implemented as a CBR, the CBR may be referred to, for example, as a CBR per I/O or a CBR per command.

In some embodiments, a data transfer may refer to an operation in which a data stream may be established between a storage device and a host without a predetermined amount of data to transfer. In such an embodiment, a specified data rate may be referred to, for example, as a specified data rate per stream.

FIG. 4 illustrates an embodiment of a data transfer at a constant bit rate and maximum peak burst size in accordance with example embodiments of the disclosure. The embodiment illustrated in FIG. 4 may be implemented, for example, with the storage device illustrated in FIG. 3 wherein the logic 307 may implement any of the functionality described with respect to FIG. 4.

In the embodiment illustrated in FIG. 4, the storage device may perform the data transfer (e.g., a read operation in which data may be transmitted from the storage device to the host, or a write operation in which data may be fetched and received at the storage device from the host) based on an I/O command received from a host. In some embodiments, the I/O command may specify an amount of data to transfer along with a source address for a read operation or a destination address for a write operation. In embodiments in which the storage device may control the transfer of data through direct memory access (DMA), the I/O command may specify both source and destination addresses for both read and write commands.

Additionally, the I/O command may be accompanied by one or both of the following parameters: (1) a specified data rate (e.g., a CBR which may be specified, for example, in terms of bits per second (bits/s)); and/or (2) a peak burst size (e.g., a maximum peak burst size which may be specified in terms of a number of bytes). One or both of the parameters may accompany the I/O command, for example, by being embedded in the command, sent as a separate command, sent as a data payload with the command, pre-programmed or configured in the storage device, and/or in any other manner.

Referring to FIG. 4, the horizontal axis may represent time, and the vertical axis may represent the data transfer rate (e.g., in Bits/s). (As mentioned above, the values on the horizontal and/or vertical axes may not be shown to scale.) The peak rate indicated on the vertical axis may represent a line rate for the host bus which may be an actual instantaneous rate at which data may be transferred on the host bus (e.g., a physical transport rate). For example, a PCIe Gen3x4 host bus may have an instantaneous (peak) rate of 4 GB/s (minus a small percentage for overhead such as encoding). As another example, a 25 Gb/s Ethernet transport link may have an instantaneous (peak) rate of 25 Gb/s (minus a small percentage for overhead).

However, an application running on the host may only need to send or receive data at a lower constant data rate than the host bus peak rate to perform its data processing function. (E.g., the host bus may have a greater bandwidth capacity than a specified CBR for a data transfer.) For example, a video processing application may only need to receive data at a sustained average data rate of 10 Mb/s without overflowing its data buffer(s) and/or without needing a large and/or expensive burst buffer capacity. Thus, as shown in FIG. 4, the specified CBR, which may be sent along with the I/O command, may be lower than the peak rate.

In some embodiments, the maximum peak burst size parameter may be used to control how long the peak transfer rate may be sustained by the storage device without causing one or more adverse effects such as congestion and/or data drop in system components such as switches and/or routers and/or endpoint application equipment. Thus, the maximum peak burst size parameter may be used by the storage device to control how long the storage device may transmit or receive data at the peak rate of the host bus transport link.

In some embodiments, a storage device may determine a peak transmission time according to the following equation:

$$\text{Peak Transmission Time} = \frac{\text{Maximum Peak Burst Size}}{\text{Host Bus Line (Peak) Rate}}. \quad (1)$$

Referring again to FIG. 4, the heavy solid line 400 may indicate the instantaneous data transfer rate between the storage device and the host. The data transfer may begin at time T1 when the storage device may begin transmitting or receiving data at the host bus peak rate. The storage device may continue transferring data at the host bus peak rate for a first portion (T2-T1) of the data transfer. The storage device may calculate the time T2-T1 such that $$\text{Maximum Peak Burst Size} = \text{Host Bus Line Rate} \times (T2-T1). \quad (2)$$

At time T2, the storage device may begin an idle portion (T3-T2) of the data transfer. Thus, the area under the curve 400 between times T1 and T2 may represent the maximum peak burst size. Equations (1) and (2) and any other equations disclosed herein may be approximate, for example, due to transition times between zero and peak data transmission rates, and/or other effects.

The storage device may then alternate between peak portions (T4-T3) and (T6-T5) and idle portions (T5-T4).

In some embodiments, the storage device may control the data transfer by scheduling the peak portions (e.g., peak transmission times) and idle portions (e.g., idle times) to achieve the specified CBR. The storage device may keep track of the total amount of data transferred and total time since the start of the data transfer (e.g., I/O command execution). The storage device may calculate the CBR as follows:

$$\text{Current Bit Rate} = \frac{\text{Current Size of Data Transferred}}{\text{Current Execution Time}} \quad (3)$$

$$\text{Current } CBR = \frac{\sum \text{data chunk}}{\sum \text{Peak time} + \sum \text{idle time}} \quad (4)$$

where Σ data chunk may represent the sum of the chunks (e.g., amounts) of data transferred during the peak portions of the data transfer, Σ Peak time may represent the sum of the time elapsed during the peak portions of the data transfer, and Σ idle time may represent the sum of the time elapsed during the idle portions of the data transfer.

As shown in FIG. 4, the thin solid line 402 may represent the effective data transfer rate (e.g., the average data transfer rate between the storage device and the host). In some embodiments, the storage device may periodically (e.g., after each peak portion and/or each idle portion of the data transfer) schedule the next peak portion and/or idle portion of the data transfer to maintain effective data transfer rate at the specified CBR. As may be apparent from FIG. 4, the effective data transfer rate 402 may fluctuate above and/or below the specified data rate (e.g., CBR) while maintaining a long-term average at or near the specified data rate.

In some embodiments, a storage device may support multiple concurrent data transfers (e.g., data streams) at multiple corresponding specified data rates and/or peak burst sizes. For example, a storage device may maintain a data structure such as a table that may keep track of active I/O commands that may have a corresponding specified data rate (e.g., CBR) and/or peak burst size (e.g., maximum peak burst size).

Table 1 illustrates an embodiment of a data structure for keeping track of active I/O commands having a specified data rate and/or peak burst size in accordance with example embodiments of the disclosure. For each I/O command (e.g., NVMe I/O command), the storage device may assign an internal identifier or tag as shown in the first column of Table 1. The storage device may allocate one entry (e.g., row) for each active I/O command. The storage device may extract from each I/O command (e.g., NVMe I/O command) a transfer length (if any), a specified data rate (e.g., CBR, if any), a maximum peak burst size (if any), or any combination thereof, which may be stored in the section of columns of data extracted from the I/O command as shown in Table 1.

totals shown in the columns in the Runtime section of Table 1 for some or all of the active entries.

In some embodiments, based on one or more current idle times, the storage device may select one or more of the commands to begin execution (e.g., perform the corresponding data transfers). For these one or more newly started commands, the storage device may update the next idle time and/or data transfer fields as appropriate. When the data transfer for a command is completed (e.g., all of the data for the command has been transferred), the corresponding entry may be removed from the table, and the internal tag may be freed up for other commands that may be added to the table. In some embodiments, a storage device may support a maximum number of active commands having a specified data rate and/or peak burst size. The maximum number of active commands may be determined, for example, based on logic, memory resources, and/or the like available at the storage device.

For purposes of illustration, a table has been described as one possible embodiment of a data structure for keeping track of active I/O commands. However, any other type of data structure may be used, for example, a key-value store, a linked list, and/or the like, or any combination thereof. The data structure may be maintained in any type of volatile and/or nonvolatile memory such as SRAM, DRAM, flash memory, persistent memory, and/or the like, or any combination thereof. The data structure may be located in any suitable location, for example, in the memory 210 or the flash media 212 in the embodiment illustrated in FIG. 2. In some embodiments, a storage device controller such as those illustrated in FIG. 2 and FIG. 3 may be implemented with one or more integrated circuit chips (e.g., a system-on-chip (SOC)), and the data structure may be located in any type of on-chip and/or off-chip memory.

FIG. 5A illustrates an embodiment of two concurrent data transfers (also referred to as I/Os) by a storage device, wherein each data transfer may have a constant bit rate and/or maximum peak burst size in accordance with example embodiments of the disclosure. The top trace shown in FIG. 5A illustrates a first data transfer having an instantaneous transfer rate 500 which may be similar to the data transfer illustrated in FIG. 4. However, at time T2, when the first data transfer enters an idle portion, the storage device may decide to use the currently idle host bus to begin a second data transfer having an instantaneous transfer rate 502 for a second I/O command as shown in the bottom trace

TABLE 1

| | Extracted from I/O command | | | Runtime, internal data structure | | |
|---|---|---|---|---|---|---|
| Internal Command Tag | Total transfer length | Specified Data Rate | Max Peak Burst Size | Cumulative execution time | Cumulative Data transfer | Current Idle time remaining |
| 12 | 5 MB | 10 MB/s | 128 KB | 3 us | 1745 KB | 1 us |
| 3 | 173 MB | 1 MB/s | 64 KB | 12 us | 126 MB | 23 us |
| 57 | 5 GB | 8 MB/s | 1 MB | 27 us | 84 MB | 17 us |
| 8 | 24 MB | 2 MB/s | 256 KB | 1 us | 64 KB | 8 us |

As the storage device executes I/O commands (e.g., performs data transfers) listed in Table 1, the storage device may keep track of the total execution time, idle time, and/or amount of data transferred for each command. For example, the storage device may essentially scan Table 1 periodically (e.g., at regular intervals such as 1 microsecond), and update the current execution times, idle times, and/or data transfer in FIG. 5A. Thus, at time T2', the storage device may initiate a first peak portion of the second data transfer which may last until time T3'. The storage device may then begin a first idle portion (T4'-T3') of the second data transfer. The storage device may then alternate between peak portions (T5'-T4') and idle portions (To'-T5') of the second data transfer.

In some embodiments, a storage device controller may seek to maximize the use of the host bus by filling any available idle times in a first data transfer with peak transmission times for one or more other data transfers. In some other embodiments, the storage device controller may allow unused idle times on the host bus to maintain one or more specified data rates (e.g., CBRs) for one or more data transfers.

Two or more concurrent data transfers may be implemented in a wide variety of schemes in accordance with example embodiments of the disclosure. For example, in some embodiments, only the first data transfer 500 may be performed at a specified data rate (e.g. a guaranteed CBR), while the second data transfer 502 may be performed by transferring data at the host bus line rate during any idle times (e.g., filling any idle times) in the first data transfer 500. Thus, the second data transfer 502 may be performed at an effective data transfer rate that may vary, and/or be determined, based on the transmission pattern the storage device controller selects for the first data transfer 500. For example, in some situations, the effective data transfer rate of the second data transfer 502 may be greater than a CBR for the first data transfer 500 if the storage device controller selects relatively many and/or long idle times for the first data transfer 500. However, in some other situations, the effective data transfer rate of the second data transfer 502 may be less than a CBR for the first data transfer 500 if the storage device controller selects relatively few and/or short idle times in the first data transfer 500.

In some other embodiments, both the first data transfer 500 and the second data transfer 502 may be performed at corresponding specified data rates (e.g. guaranteed CBRs). In such embodiments, there may be times when both the first data transfer 500 and the second data transfer 502 are idle to prevent the effective data transfer rate of each data transfer from exceeding the specified data rate (e.g., on a long-term basis and disregarding temporary fluctuations).

In some situations, one or more data chunks (e.g., an initial max peak burst size) of a second data transfer may not fit into an idle time of a first (e.g., earlier started) data transfer. In such a situation, a storage device controller may decide to delay the start (or a chunk) of the second data transfer until the first data transfer is completed or a large enough idle time becomes available during the first data transfer. The second data transfer may then proceed at a specified data rate, either alone, or concurrently (e.g., with data chunks interleaved) with one or more other data transfers. In some embodiments, one or more additional considerations such as whether data to be transferred may be located in cache (as opposed to stored in flash media), and/or whether data to be transferred may be undergoing error correction, may be used as an additional basis for scheduling one or more data transfers.

In some embodiments, a time period (e.g., 1 millisecond, 1 microsecond, 100 nanoseconds, and/or the like) for checking on the progress of one or more active commands may be adjusted to help efficiently pack data streams for two or more data transfers onto a host bus, e.g., to more fully utilize host bus bandwidth. In some embodiments, this may involve various trade-offs. For example, a shorter time period may enable finer grained control and/or more accuracy of the specified data rates (e.g., resulting in less overshoot and/or undershoot of the effective rate 402 from the CBR in FIG. 4), but it may also increase overhead power and/or other resource usage associated with more frequent calculations.

Thus, in some embodiments, the storage device may perform multiple data transfers over a host bus in an overlapping manner in which peak portions of different data transfers may be interleaved, Depending on the implementation details, this may improve the usage of system and/or device resources.

In some embodiments, a storage device may use one or more idle times to access storage media for background management operations as mentioned above such as garbage collection, wear leveling, and/or the like. Thus, media accesses for data I/O operations may be interleaved with media accesses for background management operations. In some embodiments, and depending on the implementation details, this may improve the efficiency of one or more background operations.

FIG. 5B illustrates an embodiment of N concurrent data transfers by a storage device, wherein each data transfer may have a constant bit rate and/or maximum peak burst size in accordance with example embodiments of the disclosure. In the embodiment illustrated in FIG. 5B, N may be any number. For example, in some embodiments in which a host bus may have a bandwidth measured in GB/s, and the data transfers may have specified data rates measured in a few MB/s, a storage device may support tens or even hundreds of concurrent data transfers. As illustrated in FIG. 5B, a first, second, . . . , and Nth data transfers may have instantaneous data transfer rates of 506-1, 506-2, . . . , and 506-N, respectively, FIG. 6 illustrates an embodiment of a method for receiving commands having a specified data rate and/or peak burst size at a storage device in accordance with example embodiments of the disclosure. The embodiment illustrated in FIG. 6 may be used, for example, to add entries to a data structure such as Table 1. At operation 602, a storage device may receive an I/O or other command with a specified data rate and/or peak burst size. At operation 604, the storage device may determine if it has reached a maximum number of active commands with a specified data rate and/or peak burst size. If the maximum number has been reached, the method may continue looping at operation 604. In some embodiments, the received command may be discarded, placed in a queue, and/or the like. The method may continue looping at operation 604 unto the storage device no longer has reached the maximum number of active commands with a specified data rate and/or peak burst size. This may occur, for example, when a data transfer for a command is completed and the corresponding entry is removed from a command table.

Some embodiments may implement a time-out feature in which, after receiving a command for a data transfer with a specified data rate, if a predetermined period of time expires before an entry becomes available in a command table, the storage device may begin executing the data transfer for the command, but not necessarily at the specified data rate. For example, the storage device may begin the data transfer using a best efforts approach to sending data during any available idle times and/or other sources of bandwidth on the host bus. In some embodiments, and depending on the implementation details, this may prevent or reduce latency for one or more data transfers.

In some embodiments, a host may keep track of one or more commands for data transfers with a specified data rate and/or peak burst size that the host may send to a storage device. Based on a bandwidth of a host bus connection to the storage device, the host may limit the combined specified data rate of commands it may send to the storage device to a total that may not exceed the host bus bandwidth (e.g., adjusted for a suitable amount of overhead). Thus, in some embodiments, a host may not demand more aggregate data transfer bandwidth than may be supported by the storage device and/or the host bus connection.

At operation 606, the storage device may allocate one entry (e.g., a row in a table) for the received command and assign a tag to the command. At operation 608, the storage device may extract a transfer length (if any), a specified data rate (if any), and/or a maximum peak burst size (if any) from the command and store them in the corresponding table entry for the command. At operation 610, the storage device may initialize the table entry for the command and begin looking for an idle time or other opportunity on a host bus to begin a data transfer for the command. The method may then return to operation 602.

FIG. 7 illustrates an embodiment of a method for executing commands having a specified data rate and/or peak burst size at a storage device in accordance with example embodiments of the disclosure. The embodiment illustrated in FIG. 7 may be used, for example, to process and/or remove entries to a data structure such as Table 1.

At operation 702, a storage device may delay for a fixed time period (e.g., 1 microsecond) or implement any other feature that may enable it to periodically check on the progress of one or more active commands. At operation 704, the storage device may check if all active commands have been completed. If all active commands are completed, the method may loop to operation 702. If there are any pending active commands having a specified data rate and/or peak burst size, the method may proceed to operation 706 where the storage device may update the cumulative execution (e.g., peak) time and the idle time remaining for one or more of the pending active commands. This may be implemented, for example, using a data structure such as Table 1.

At operation 708, the storage device may determine if an idle time has expired for a currently executing active command. If the idle time has not expired, the method may loop back to operation 704. If the idle time has expired, the method may proceed to operation 710 where the storage device may select and transmit the next data chunk for a specific command. At operation 712, the storage device may determine whether all data associated with the command has been transferred. If all data for the command has been transferred, the method may proceed to operation 714 where the storage device may remove the entry associated with the command from the data structure such as Table 1. The method may then loop back to operation 704. If, at operation 712, all of the data for the command has not been transferred yet, the method may proceed to operation 716 where the storage device may update the cumulative data transfer amount and select the next current idle time for the command in Table 1. The method may then loop back to operation 704.

In some embodiments, at operation 710, the storage device may always select and transmit the maximum peak burst size as the next data chunk. The storage device may then maintain the specified data rate (e.g., CBR) by selecting the next idle time at operation 716 such that the average effective data rate converges to the specified data rate. In some other embodiments, the storage device may attempt to select the transmission time of the next data chunk at operation 710, and/or the idle time at operation 716, to prevent the effective data rate from overshooting and/or undershooting the specified data rate by more than a certain amount.

A storage device in accordance with example embodiments of the disclosure may communicate, to one or more hosts, its capability to perform data transfers with a specified data rate and/or peak burst size through any mechanism. For example, in some embodiments, a storage device may advertise capabilities through an Identify data structure which may be implemented, for example, in an NVMe command structure. Some examples of capabilities that may be exposed to a host may include: (1) the capability of supporting a specified data rate (e.g., a CBR per I/O); (2) the capability of supporting a peak burst rate per I/O; and/or (3) the maximum number of data transfers and/or streams supported with a specified data rate and/or peak burst rate. In some embodiments, a storage device may allow a host to enable and/or disable one or more of its capabilities to perform data transfers with a specified data rate and/or peak burst size.

In some embodiments, a host may query a storage device to determine a capability of the storage device to perform data transfers with a specified data rate and/or peak burst size. For example, in some embodiments implemented with NVMe infrastructure, an NVMe driver and/or system software at a host may read an Identify data structure received from a connected storage device to determine that the storage device supports CBR per I/O. The driver may then configure and/or enable a CBR per I/O feature in the storage device, for example, using NVMe Set Feature and/or Get Feature commands. After the CBR per I/O feature is enabled, the NVMe driver and/or system software may insert desired CBR and/or maximum peak burst size fields into one or more NVMe I/O commands it sends to the storage device.

FIG. 10 illustrates an example embodiment of a system having a host and a storage device capable of performing data transfers with a specified data rate and/or peak burst size in accordance with example embodiments of the disclosure. The system illustrated in FIG. 10 may include a host 1001 and a storage device 1000 connected by a host bus 1016. The host 1001 may include logic 1014 that may implement any functionality of a host as described herein. For example, the logic 1014 may enable the host 1001 to query the storage device 1000 to determine a capability of the storage device 1000 to perform data transfers with a specified data rate and/or peak burst size. The logic 1014 may be implemented with hardware, software, or any combination thereof, for example, as described above with respect to the logic 307 illustrated in FIG. 3.

FIG. 8 illustrates an example embodiment of a storage device that may implement data transfers with a specified data rate and/or peak burst size in accordance with example embodiments of the disclosure. The embodiment illustrates in FIG. 8 may be used, for example, to implement the embodiment illustrated in FIG. 3.

The storage device 800 illustrated in FIG. 8 may include one or more command queues 822, a host interface 802, a storage device controller 804, and flash media 812. The storage device controller 804 may include computation logic 807A, command logic 807B, a command data structure 810, an FTL 806, and a flash interface 808. In some embodiments, the host interface 802, FTL 806, flash interface 808, and/or flash media 812 may be implemented in a manner similar to corresponding components in the embodiments illustrated in FIG. 2 and FIG. 3. In some embodiments, any or all of the one or more command queues 822, the host interlace 802, and/or storage device controller 804, including the computation logic 807A, command logic 8078, command data structure 810, FTL 806, and/or flash interface 808, may be implemented with hardware, software, or any combination thereof, for example, as described above with respect to the embodiment illustrated in FIG. 3.

The one or more command queues 822 (e.g., NVMe submission and/or completion queues) may be implemented at the host, at the storage device, or in a combination thereof.

The command logic 807B may parse and/or execute commands, including commands accompanied by specified data rate and/or peak burst size, received from a host. In some embodiments, the command logic 807B may implement some or all of the functionality relating to receiving and/or executing commands such as that described above with respect to FIG. 4, FIG. 5A, FIG. 6, and FIG. 7. For example, the command logic 807B may create and/or maintain a data structure such as Table 1 to manage active commands with a specified data rate and/or peak burst size.

The computation logic 807A may perform one or more calculations related to maintaining a specified data rate for one or more data transmissions. For example, in some embodiments, the computation logic 807A may perform any or all of the calculations illustrated in Equation (1), Equation (2), Equation (3), and/or Equation (4). As another example, in some embodiments, the computation logic 807A may perform any or all of the calculations to determine the current execution time, current data transfer, and or current Idle time in the columns of the runtime section of Table 1.

The command data structure 810 may be used, for example, to store any data structures used to implement data transfers with a specified data rate and/or peak burst size. For example, the command data structure 810 may be used to store a command table such as Table 1. The command data structure 810 may be implemented, for example, with DRAM, SRAM, flash memory, persistent memory, and/or the like. The command data structure 810 may be implemented with memory that may be integral with, and/or separate from, one or more other components of the storage device controller 804.

Determining Specified Data Rate At Storage Device

Some storage devices in accordance with example embodiments of the disclosure may determine a specified data rate and/or a peak burst size for one or more data transfers at the storage device. For example, in some embodiments, a storage device may collect data by monitoring commands received with specified data rates. Any type of algorithm such as AI (e.g., machine learning) may be applied to the collected data to classify the commands into clusters having similar patterns which may include similar specified data rates. Thus, a specified data rate may be assigned to each cluster of commands having a similar pattern. Then, when a command is received without a specified data rate, the data rate of a cluster having a similar pattern may be applied to the command. Alternatively, even if a command is received with a specified data rate, the storage device may substitute a learned data rate for the specified data rate if the command has a pattern that is similar to a known cluster. In some embodiments, a default value for a data rate may be applied to a command based on a pattern of the command.

Examples of parameters may be used to determine patterns of commands may include the contents of queues such as submission and/or completion queues, submission queue IDs (SQIDs), completion queue IDs (CQIDs), logical block address (LBA) ranges, Command Ds, namespace identifiers (NSIDs), stream identifiers (Stream IDs), zone IDs, Host identifiers (Host IDs), network parameters such as Ethernet medium access control (Ethernet MAC), TCP/IP, User Datagram Protocol/Internet Protocol (UDP/IP), date, time, and/or the like, and/or any storage and/or networking parameters.

Thus, in some embodiments, a storage device may perform a data transfer with a specified data rate and/or a peak burst size, with little or no direct host input, based on one or more monitored parameters such as those described above.

In some example embodiments, using a pattern recognition scheme as described above, a storage device may determine that certain specified data rates appropriate for video streaming may be applied to data transfers during evening hours in residential areas and/or networks when users may be most likely to watch videos. For example, historical data may show that these types of streams may have average data rates of about 10 MB/s when averaged over a few hours. A storage device may also determine that certain peak burst sizes may be applied to the video streaming data transfers at these times and places based on learning the buffer sizes of user devices and/or network components. In some example embodiments, using a pattern recognition scheme as described above, a storage device may determine that a certain specified data rate may be applied to commands from certain submission queue IDs.

In some embodiments, a storage device may apply or more learned values specified data rates and/or peak burst sizes to data transfers, for example, by loading one or more of these learned values into a corresponding entry of a data structure such as Table 1.

Additional Embodiments

Some systems, methods, and/or devices in accordance with example embodiments of the disclosure may implement any number of the following features and/or provide any number of the following advantages. Constant bit rate (CBR) execution of I/O commands may be implemented for data transfers to and/or from host memory. A host may specify a CBR for one or more NVMe I/O commands. A host may specify a maximum peak burst size (PBS) for one or more NVMe I/O commands. A host may enable and/or disable a CBR feature in a storage device. A storage device may advertise a CBR feature, for example, through an Identify data structure. A storage device may advertise a maximum number of concurrent CBR streams it may support. One or more CBR features may be independent of a transport interface and/or protocol such as PCIe, Ethernet, proprietary interfaces and/or protocols, Toggle, ONFI, double data rate (DDR1, DDR2, DDR3, DDR4, and/or the like) TCP/IP, UDP/IP, InfiniBand, RDMA, and/or the like. Some embodiments may provide fine granular bandwidth control of data transfers. Some embodiments may provide more predictable behavior of one or more host busses, networks, switches, routers, and/or the like. Some embodiments may provide more predictable data buffer usage in end use applications. Some embodiments may enable more efficient implementations of streaming data processing applications. Some embodiments may be beneficial for latency sensitive applications such as mobile applications, gaming, and/or the like, Some embodiments may enable more efficient storage device controller background operations. Some embodiments may enable more efficient and/or optimal placement of data based, for example, on throughput requirements. Some embodiments may provide efficient support for multi-tenancy and/or virtualization use cases that may share a storage device.

FIG. 9 illustrates an embodiment of a data transfer method in accordance with example embodiments of the disclosure. The method illustrated in FIG. 9 may be implemented, for example, using any of the apparatus illustrated in FIG. 3 and FIG. 8. The method may begin at operation 902. At operation 904, the method may receive, at a storage device, a command for a data transfer between the storage device and a host. At operation 906, the method may determine a specified data rate for the data transfer. At operation 908, the method may perform the data transfer between the storage device and the host based on the command, wherein the storage device controls the data transfer based on the specified data rate. The method may end at operation 910.

The embodiment illustrated in FIG. 9, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:

receiving, at a device, a first command;

receiving, at the device, a second command;

performing, by the device, using a first performance parameter based on the first command, a first portion of a first data transfer;

performing, by the device, based on the performing the first portion of the first data transfer, using a second performance parameter based on the second command, a first portion of a second data transfer; and performing, by the device, based on the performing the first portion of the second data transfer, a second portion of the first data transfer.

2. The method of claim 1, wherein:

the first command is received from a first host;

the first data transfer is performed between the device and the first host;

the second command is received from a second host; and the second data transfer is performed between the device and the second host.

3. The method of claim 1, wherein:

the first command is received from a host;

the first data transfer is performed between the device and the host;

the second command is received from the host; and the second data transfer is performed between the device and the host.

4. The method of claim 1, wherein the first data transfer further comprises a third portion.

5. The method of claim 4, wherein the first portion of the first data transfer comprises a peak portion, and the third portion of the first data transfer comprises an idle portion, the method further comprising controlling, at the device, the peak portion and the idle portion based on the first performance parameter.

6. The method of claim 1, further comprising controlling, at the device, the first data transfer based on a burst size.

7. The method of claim 6, wherein the first portion of the first data transfer comprises a peak portion, the method further comprising controlling, at the device, the peak portion based on the burst size.

8. The method of claim 6, further comprising receiving, from a host, the burst size.

9. The method of claim 8, further comprising determining, at the device, the burst size.

10. The method of claim 9, wherein the determining the burst size comprises:

monitoring, at the device, one or more data transfers by the device; and determining, at the device, the burst size based on the monitoring.

11. The method of claim 1, wherein the first performance parameter is received from a host.

12. The method of claim 1, further comprising determining, at the device, the first performance parameter.

13. The method of claim 12, wherein the determining comprises:

monitoring, at the device, one or more data transfers by the device; and determining, based on the monitoring, the first performance parameter.

14. The method of claim 1, wherein the first performance parameter comprises a constant bit rate.

15. The method of claim 1, wherein the first data transfer overlaps a background operation of the device.

16. A device comprising:

storage medium; and a controller configured to:

receive a command for a data transfer;

perform, using a burst size based on the command, a first burst portion of the data transfer;

perform, based on the command, based on the first burst portion of the data transfer, an idle portion of the data transfer; and perform, based on the command, based on the idle portion of the data transfer, using the burst size based on the command, a second burst portion of the data transfer;

wherein at least one of the first burst portion of the data transfer, the idle portion of the data transfer, or the second burst portion of the data transfer is controlled by the controller.

17. The device of claim 16, wherein:

the command comprises a first command, the data transfer comprises a first data transfer, and the burst size comprises a first burst size; and the controller is further configured to:

receive a second command for a second data transfer;

perform, using a second burst size based on the second command, a first burst portion of the second data transfer;

perform, based on the first burst portion of the second data transfer, an idle portion of the second data transfer; and perform, based on the idle portion of the second data transfer, using the second burst size based on the second command, a second burst portion of the second data transfer.

18. The device of claim 17, wherein the first data transfer overlaps the second data transfer.

19. A device comprising:

storage media;

a first interface connected to the storage media; and a controller connected to the first interface, wherein the controller is configured to:

receive, using a second interface, a first command for a first data transfer;

receive, using the second interface, a second command for a second data transfer;

perform, using a first performance parameter based on the first command, a first portion of the first data transfer between the second interface and the storage media;

perform, based on performing the first portion of the first data transfer, using the a second performance parameter based on the second command, a first portion of the second data transfer between the second interface and the storage media; and perform, based on performing the first portion of the second data transfer, a second portion of the first data transfer.

20. The device of claim 19, wherein the controller is configured to:

receive a query; and send a performance capability of the device based on the query.

* * * * *